United States Patent [19]
Keim

[11] 3,975,132
[45] Aug. 17, 1976

[54] DEVICES FOR USE IN THE APPLICATION OF WORKING PRESSURES AND APPARATUS INCLUDING SUCH DEVICES

[75] Inventor: Karl H. Keim, South Portland, Maine

[73] Assignee: United Industrial Syndicate, Inc., Portland, Maine

[22] Filed: June 5, 1975

[21] Appl. No.: 584,060

[52] U.S. Cl. .............................. 425/406; 425/141; 425/394; 425/411
[51] Int. Cl.² .................... B29C 17/00; B30B 1/16; B30B 9/28; B30B 15/14
[58] Field of Search .......... 425/394, 395, 398, 406, 425/141, 408, 411, 155; 226/172

[56] References Cited
UNITED STATES PATENTS

| | | | |
|---|---|---|---|
| 1,333,648 | 3/1920 | Wennberg | 425/406 |
| 2,624,915 | 1/1953 | Corson | 425/406 |
| 3,504,074 | 3/1970 | Snow | 425/155 X |
| 3,543,344 | 12/1970 | Hunt | 425/394 |
| 3,632,250 | 1/1972 | Snow | 425/155 |
| 3,687,586 | 8/1972 | Hara et al. | 425/411 X |
| 3,816,052 | 6/1974 | Schoppee et al. | 425/406 |

FOREIGN PATENTS OR APPLICATIONS

| | | | |
|---|---|---|---|
| 856,335 | 12/1960 | United Kingdom | 425/406 |

Primary Examiner—J. Howard Flint, Jr.

[57] ABSTRACT

In the application of working pressures, devices are used of the type having at least two members by which the working pressure is applied and a connection between them operable to vary the relationship of one of them relative to the work. Each connection includes first parts with the first part rotatably carried by the one member. Each part has an eccentric portion of a circular section with that of the first part rotatable within the eccentric portion of the second part and the second part is rotatably carried by the other pressure-applying member. Adjusting means are provided to turn the parts equally but oppositely with the members operatively connected and with the axis of the eccentric portion of the second part always in the plane of a predetermined line of force inclusive of the axis of the first part. The devices are shown as the toggle joints operable by means responsive to fluid under pressure to move one of the platens of the forming station of a thermoformer in opening and closing the molds, said station also desirably having means to assist in the reciprocation of the platens with the toggle joints desirably having an acute angular relationship when the molds are open. The adjusting means desirably but not necessarily includes a servo motor controlled by a gauge continuously monitoring the thickness of the sheet material being advanced through the thermoformer.

15 Claims, 10 Drawing Figures

DEVICES FOR USE IN THE APPLICATION OF WORKING PRESSURES AND APPARATUS INCLUDING SUCH DEVICES

BACKGROUND REFERENCES

U.S. Pat. No. 2,624,915
U.S. Pat. No. 3,504,074
U.S. Pat. No. 3,632,250
U.S. Pat. No. 3,816,052
U.S. Pat. No. 3,828,997

BACKGROUND OF THE INVENTION

There are many products that are made by the coaction of two units under substantial pressures against interposed material. The operative relationship of the two units is important and varies with the type of material, its thickness and the nature of the work to be done.

Where, as is often the case, the operative relationship of the two units must be varied from time-to-time, adjusting means must be incorporated in the means by which one unit is reciprocated into and out of its operative position in which the full working pressure applied to the material. The adjusting means must afford an adequate range of precise adjustments and be easily operated under all conditions and at the same time be capable of withstanding, without undue wear, the substantial pressures commonly employed and to which the parts of the adjusting means are subjected.

Fine adjustments may be made by means of a cam and cams having releasably interconnected eccentrics have been used in cam operated presses with fine stroke adjustments effected by disconnecting eccentrics so that one may be turned relative to the other to the required extent and then again locked together.

The Present Invention

The general objectives of the present invention are to provide devices for use in transmitting substantial working pressures and employing double eccentrics that are adjustable at all times without the force resulting from the application of the working pressure becoming torsional and to apparatus including such devices and of the type having two coacting units with at least one unit movable relative to the other by means of such devices into and out of an operative, pressure-applying relationship with the other unit.

In accordance with the invention, these objectives, in the case of the devices, is attained with a device having at least one first member and at least one second member and a connection between them operable to effect precise adjustments of the relationship of the second member to the work. The connection includes first and second rotatable parts, the first part rotatably supported by the first member. Each part includes a first portion and an eccentric second portion, both of circular section with the eccentric portion of the first part rotatable within the eccentric portion of the second part and with the latter portion rotatably carried by the second member. Means connected to the first portion of each part are operable to rotate the parts equally but oppositely to effect precise adjustments of the operative relationship of the movable unit with the work with the axis of the eccentric portion of the second part always in the plane of a predetermined line of force that includes the axis of the first part. The first portions are axially spaced and exposed to be turned in making adjustments.

Another objective of the invention is to enable each connection to be adjusted without disconnecting the parts, an objective attained by employing adjusting means that are also operable to maintain the adjusted relationship of the two parts of the connections.

Another objective of the invention is to provide such devices as toggle joints, an objective attained by providing that the first rotatable part is a shaft, the first member mounting or supporting structure and the second member is an arm of a toggle joint. The shaft and the hub are each provided with the driven gear of a gear train that provides for their opposite rotation, and the gear train is mounted on the first member of each toggle joint.

Another objective of the invention is concerned with the means for turning the first portions equally but oppositely to enable precise fine adjustments to be effected and maintained. This objective is attained with the first portions of each part a worm gear. The first member has shafts, one for each worm gear and provided with a worm in mesh therewith and interconnected by spur gears so that the rotation of one shaft is attended by rotation of the other shaft equally but oppositely. The worm gear of the second part is eccentric relative to the eccentric second portion thereof and is disposed and dimensioned relative thereto so that the worm gear of the second part remains in proper meshing relationship with the appropriate worm throughout the range of adjustments afforded by the connection.

A particular objective is to provide that toggle joints may be arranged in pairs with their connections axially aligned and adjusted by common means, an objective attained with the shafts joined between intermediate supporting structure and provided with a common worm gear and with a first shaft carried by the intermediate supporting structure having a worm in mesh therewith. The shafts having the worm by which the second part worm gears are driven are externally of and on opposite sides of the intermediate supporting structure with the spur gear of each of said shafts in mesh with the spur gear of the first shaft. Yet another particular objective of the invention is to utilize one of the shafts of each toggle joint or of each pair thereof, preferably the shaft by which the first part of a connection is rotated as a drive shaft connected to the corresponding shaft of another toggle joint spaced lengthwise therefrom.

The general objective, in the case of apparatus of the type having at least one work engaging unit moved into and out of its operative, pressure-applying position, is attained by the use of a plurality of toggle joints in accordance with the invention and actuated by fluid pressure operated means and providing that the adjusting means is common to all of them. It is preferred also to provide such apparatus with second fluid pressure operated means also operable to move said unit and enabling the toggle joints to have an initial, acute angular relationship without that relationship being a cause of excessive wear.

Yet another objective of the invention is to provide such apparatus, when of the type processing long lengths of sheet material the thickness of which cannot be precisely controlled in its production, that enables the work to be performed with uniform results, an objective attained by providing a servo motor to operate the adjusting means and effecting the operation of the servo motor by means under the control of a thickness gauge monitoring the sheet.

BRIEF DESCRIPTION OF THE DRAWINGS

In the accompanying drawings, preferred embodiments of the invention are illustrated

THE PREFERRED EMBODIMENT OF THE INVENTION

Figure 1:
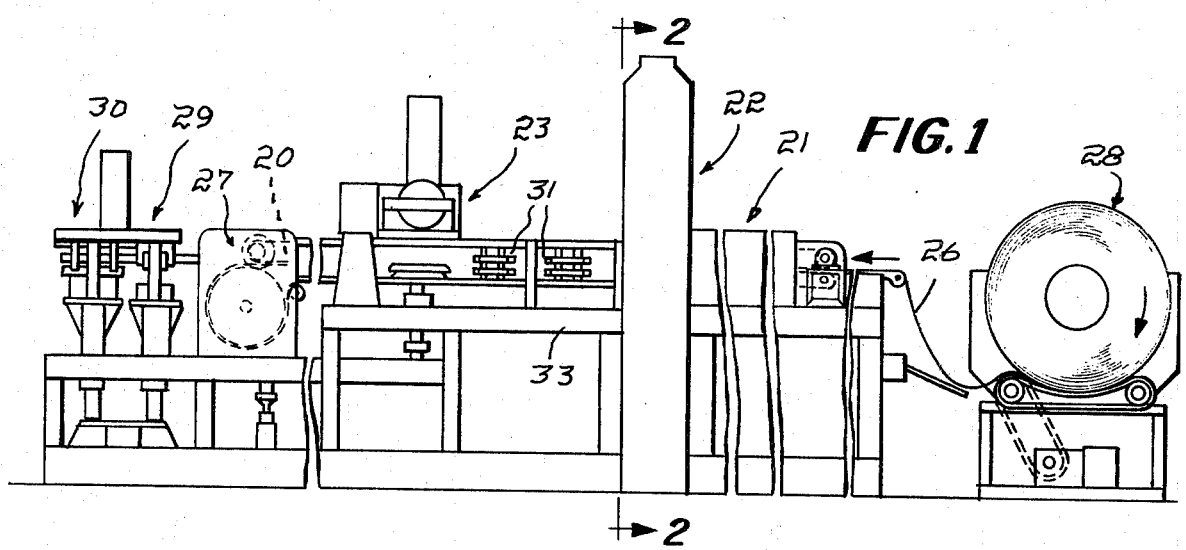
FIG. 1 is a side view of a thermoformer having a forming station in accordance with the invention, the view broken away to foreshorten the drawing.

The apparatus shown in the drawings is a thermoformer having a conveyor, generally indicated at 20, extending through heating, forming, and printing stations, generally indicated at 21, 22, and 23, respectively. The conveyor 20 includes, see FIG. 2, vertically aligned chains 24 and 25 adjacent each side of the thermoformer with their proximate courses operable to grip between them the margins of a sheet of thermoplastic material indicated at 26. The conveyor drive is located at an indexing station, generally indicated at 27, and it may be of any type operable step-by-step to pull predetermined lengths of the sheet 26 from a roll 28 at the infeed end of the thermoformer, each length determined by that required at the forming station 22 and the conveyor drive subject to dwells that are timed as required for the forming and printing operations. The conveyor 20 is of sufficient length to ensure that at its outfeed end, the sheet 26 is sufficiently cool to permit it to be advanced, without the danger of warping, into clamping and blanking stations, generally indicated at 29 and 30, respectively. To prevent warping after the sheet 26 leaves the forming station, the proximate courses of the chains 24 and 25 are biased towards each other by spring-loaded shoes 31.

As it is with the forming station 22 that the present invention is concerned, only that station is herein detailed, as the other stations, the conveyor, as well as the indexing drive may be of constructions in accordance with U.S. Pat. Nos. 3,504,074, 3,632,250, and 3,828,997, or other than those described in said patents.

Figure 2:
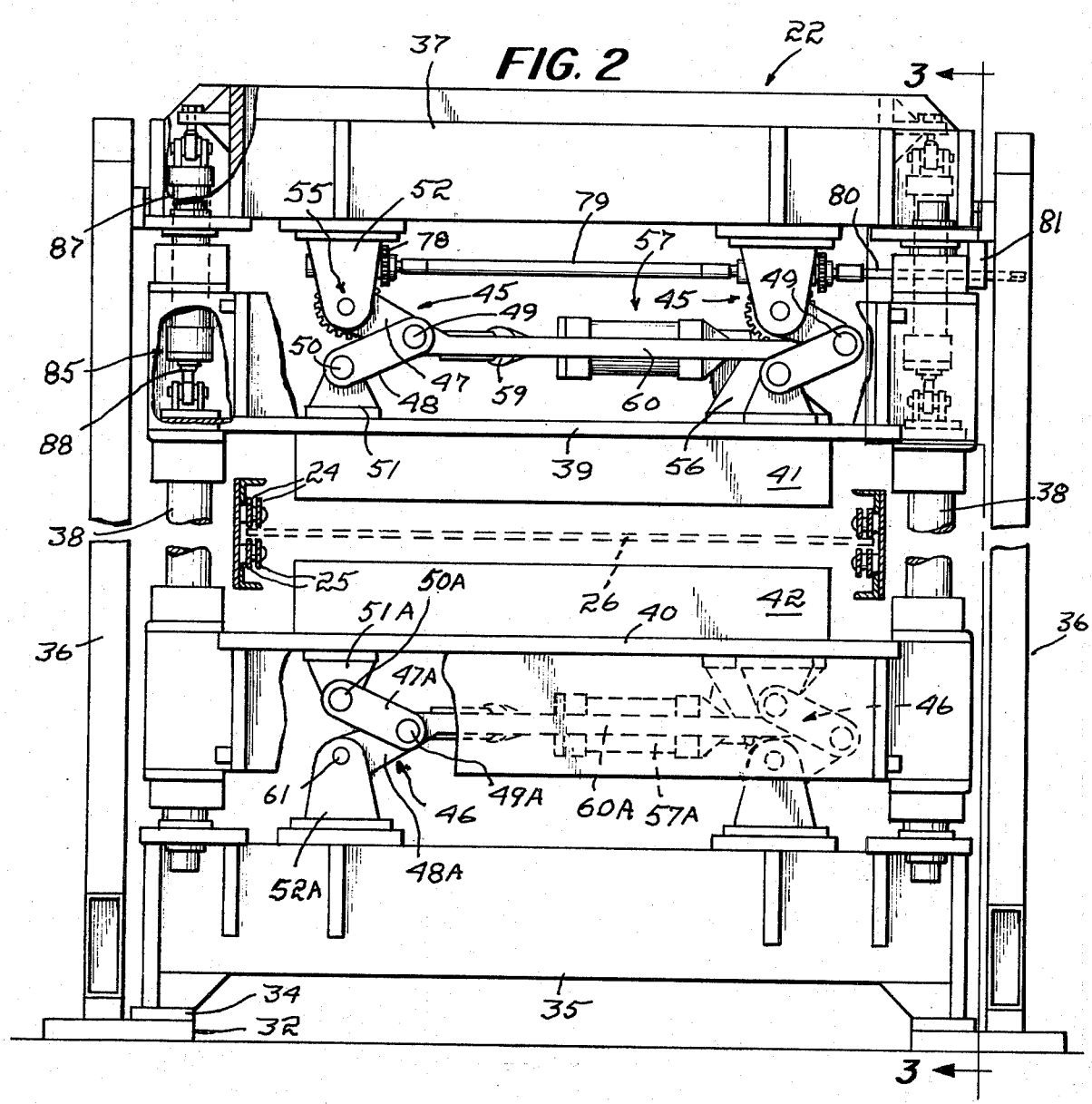
FIG. 2 is a section, on an increase in scale, taken approximately along the indicated line 2—2 of FIG. 1 with the platens inoperatively positioned to open the molds.
Figure 3:
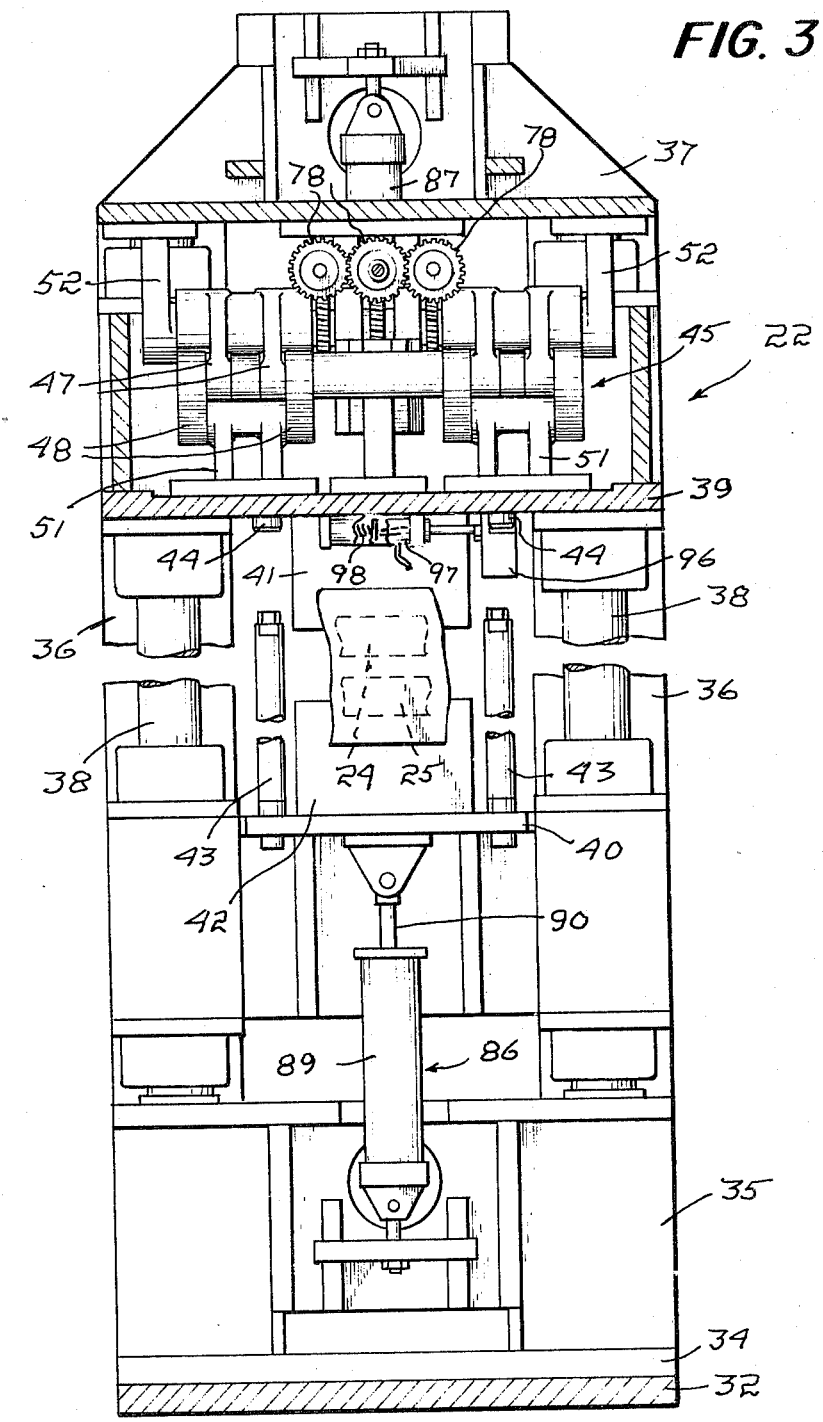
FIG. 3 is a section, on a further increase in scale, along the indicated line 3—3 of FIG. 2.

The forming station 22 has, see FIGS. 2 and 3, a base plate 32 secured to each side of the framework 33 of the thermoformer and each plate 32 is provided with a base 34 to which a transverse support 35 is secured. Side frames 36 anchored to the base plate 32 support a transverse head 37. Adjacent each side frame 36 there is a pair of vertical posts 38 with their ends secured to the base 35 and the head 37 and with corresponding posts of each pair transversely aligned.

The posts 38 slidably support upper and lower platens 39 and 40, respectively. Molds 41 and 42 are detachably secured to the platens 39 and 40, respectively, and these coact to form articles in the length of the heated sheet 26 in the forming station 22 when the platens are brought towards each other into a predetermined operative relationship from a predetermined inoperative relationship in which the molds 41 and 42 are spaced apart in their open positions to permit the passage of that length of the sheet 26 from the forming station 22 when the conveyor 20 is again indexed. The molds 41 and 42 are water cooled but as the means for so doing forms no part of the present invention, the molds are not herein detailed to show that or other features.

The lower platen 40 has, at each end, a pair of vertical stops 43 engageable by vertically aligned stops 44 on the undersurface of the platen 39 with engagement of the stops establishing the operative relationship of the platens and, accordingly, the closed position of the molds.

In accordance with the invention, each of the platens 39 and 40 is subject to movement by a series of toggle joints with those of the upper platen 39 indicated generally at 45 and those of the lower platen indicated generally at 46.

The toggle joints 45 are arranged in pairs, one pair adjacent each end of the platen 39. Each toggle joint 45 includes a pair of first arms 47 and a pair of second arms 48 with a pivot 49 interconnecting the proximate ends of the arms 47 and 48. The other ends of the arms 48 are connected to the ends of a pivot 50 extending through a mount 51 fixed on the upper surface of the platen 39 and the undersurface of the head 37 is provided with mounts 52 and an intermediate U-shaped support 53 providing a closely spaced pair of mounts 54. The other ends of the arms 47 of each toggle joint 45 are rotatably supported by a connection, generally indicated at 55 and subsequently detailed, rotatably supported by one of the mounts 52 and the proximate intermediate mount 54.

A mount 56 fixed on the platen 39 adjacent one end and centrally thereof has the cylinder of a double acting, hydraulic ram, generally indicated at 57, pivotally connected thereto. The stem 58 of the ram 57 is provided with a cross head 59 connected to a pair of parallel actuators 60. Each end of each actuator 60 is connected to the pivot 49 of the appropriate one of the toggle joints 45 whereby, when the ram 57 is actuated in one direction, the platen 39 is forced downwardly into its operative position and when the ram 57 is actuated in the other direction, the platen 39 is returned to its inoperative position.

Corresponding parts of the toggle joints 46 are distinguished by the suffix addition A to the appropriate reference numeral as are the corresponding mounts. The mounts 51A are fixed on the undersurface of the platen 40 and the mounts 52A and the support 53A are anchored to the transverse support 34. The attachment of the cylinder of a double acting hydraulic ram, generally indicated at 57A, to the platen 40 and the connection of its stem 58A to the toggle joints 46 is effected in the same manner as in the case of the ram and corresponding parts are distinguished by the suffix addition A to the appropriate reference numerals.

While the toggle joints 45 and 46 are otherwise identical, it will be noted that in the case of the toggles 46, the arms 47A are connected to the mounts 52A and 54A by a pivot 61 instead of the connection 55.

At this point, reference is made to the fact that the thickness of the sheet material being processed may vary from one roll to another with variations being in terms of thousandths of an inch. It should also be noted that the required article-forming P.S.I. pressures may be in the order of 100 tons or more. As a consequence, the operative relationship of the molds 41 and 42 is critical so that precise adjustments of that relationship must be made as required by the thickness of the material to be used.

Figure 6:
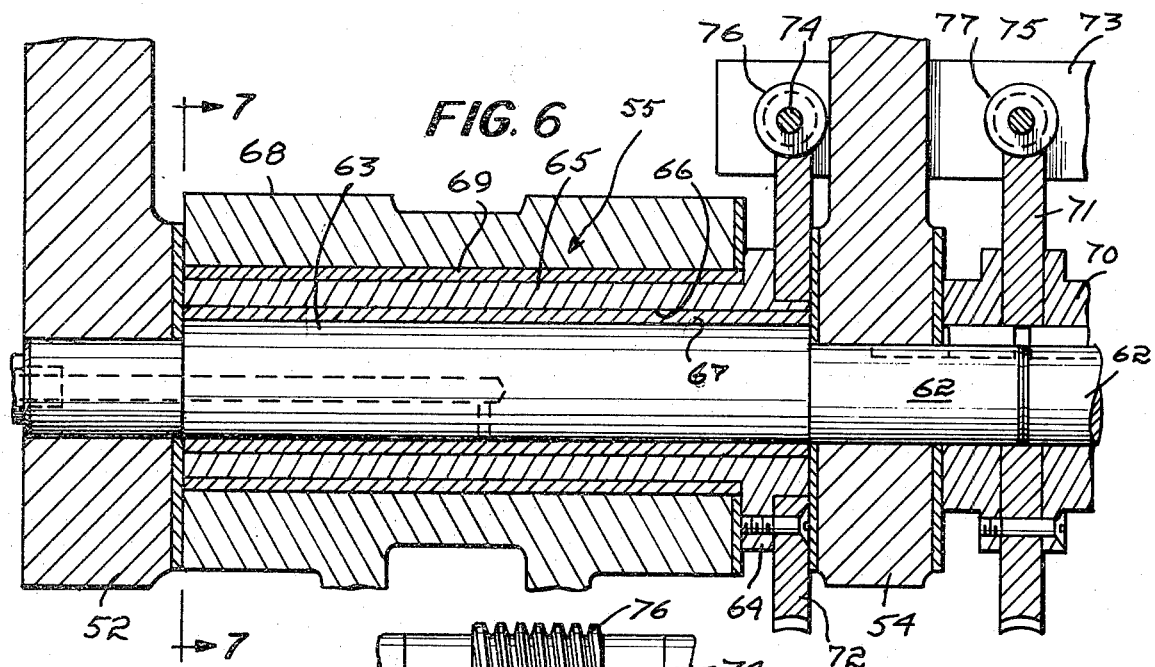
FIG. 6 is a view, further sectioned and on a further increase in scale of the left hand half of FIG. 5.
Figure 7:
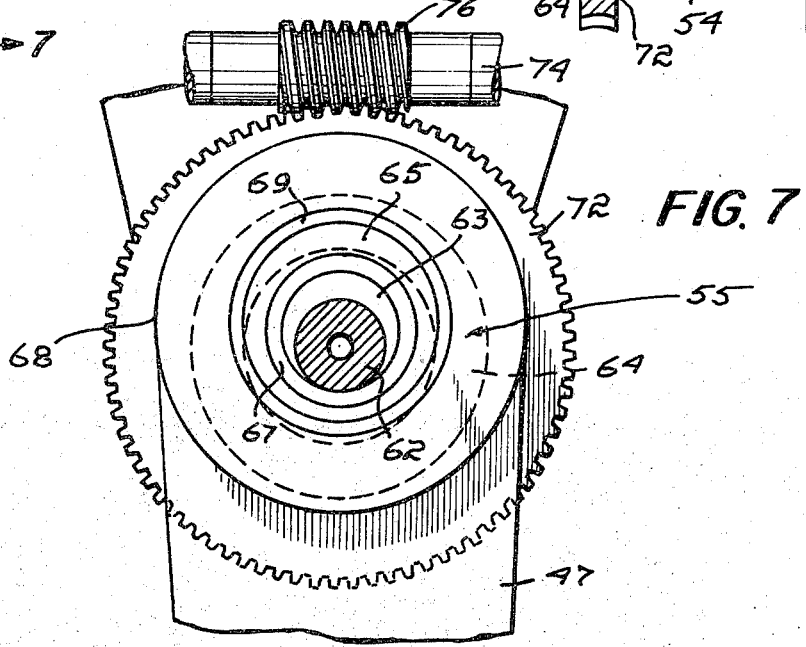
FIG. 7 is a section, taken approximately along the indicated line 7—7 of FIG. 6 showing the parts of the adjustable connection and their relationship to the force exerted thereon when the platen is in its operative, pressure-applying position.

In accordance with the invention, such adjustments are made by means of the connections 55 and, as may best be seen in FIGS. 6 and 7, each connection 55 includes, as a first part, a shaft 62 whose ends are rotatably supported by a mount 52 and a mount 54 and which includes an intermediate eccentric portion 63 of circular section. Each connection also includes a second part, a hub 64 having an eccentric portion 65 of circular section having a bore 66 receiving the eccentric portion 63 of the first part and a bushing 67. The eccentric portion 65 is rotatably supported by the hub 68 of the arms 47 within a bushing 69.

The shafts 62 of each pair of transversely aligned toggle joints 45 have splined connections between the mounts 54 with the hub 70 of a worm gear 71 and each hub 64 has a worm gear 72 secured thereto, the worm gears 71 and 72 identical apart from the manner of their attachment. It will be noted that the hub 64, while concentric with the shaft 62 when the parts of the connections 55 are positioned as shown in FIG. 7 is an opposite eccentric relative to the axis of the eccentric portion 65 as it is necessary, for reasons presently apparent, that the gears 72 have that relationship.

Each pair of mounts 54 supports transverse members 73 rotatably supporting a pair of parallel shafts 74 and an intermediate parallel shaft 75, the shaft 75 between the mounts 54 and each shaft 74 outside but adjacent the appropriate one of the mounts 54. Each of the shafts 74 is provided with a worm 76 in mesh with the appropriate one of the worm gears 72 and the shaft 75 has a worm 77 meshing with the worm gear 71. The shafts 74 and 75 also include identical, meshing gears 78, see FIG. 3. The shafts 75 of the longitudinally aligned pairs of mounts 54 are connected by a shaft 79 while the shaft 75 of one pair of said mounts 54 has a drive shaft 80 rotatably supported as at 81 located at one side of the forming station 22 where it may be engaged by a wrench and turning in one direction or the other to adjust the operative position of the platen 39. It will be apparent that if the shaft 80 is turned in either direction, the above detailed gear train effects equal rotation of the worm gears 71 and 72 but with the gears 72 turning oppositely to the gears 71 and the gearing is operable to hold the two parts of each connection 55 against turning from their selected relationship.

Figure 4:
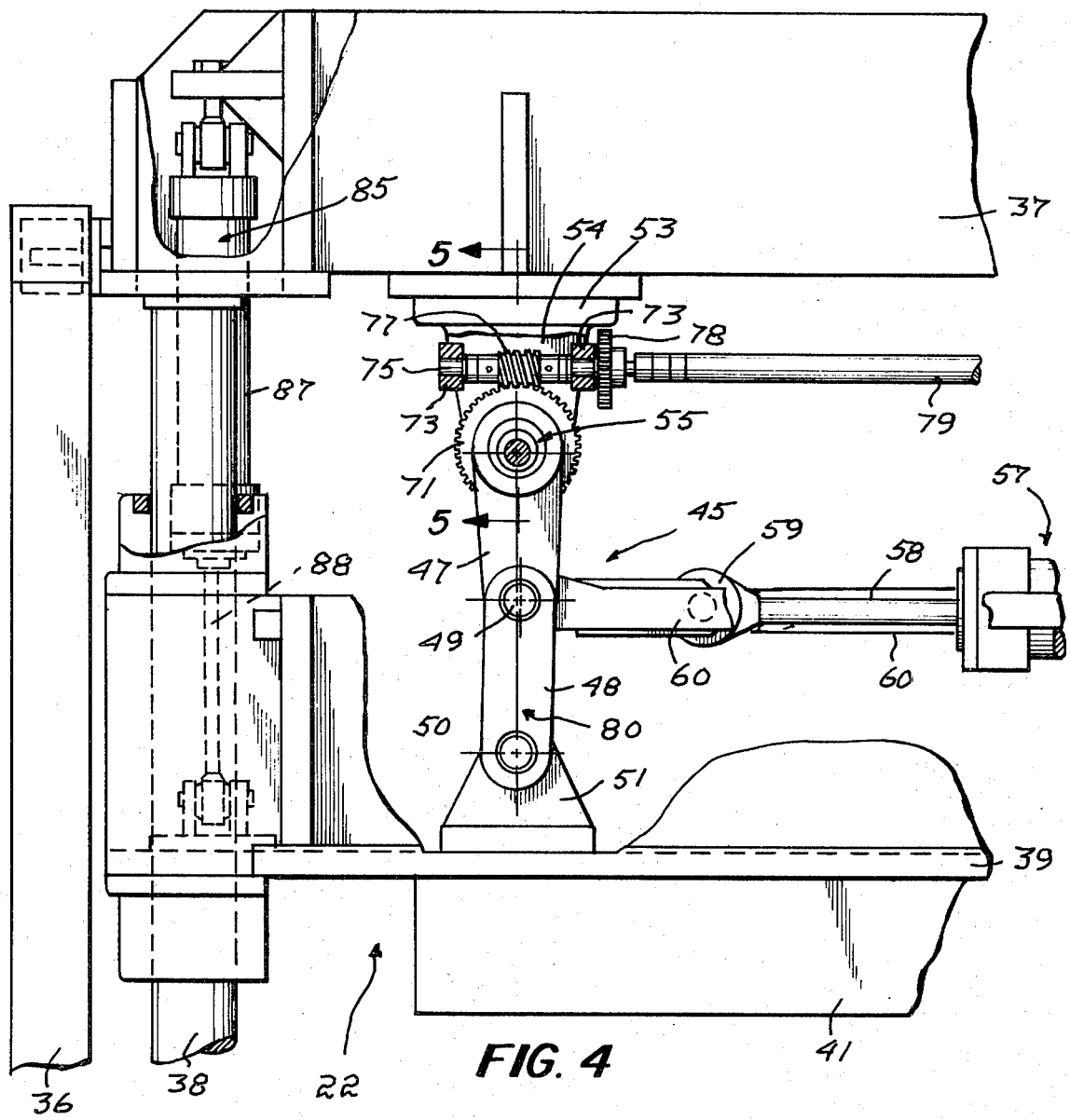
FIG. 4 is a fragmentary and partly sectioned view, on a substantial increase in scale, of part of the apparatus shown in FIG. 2 showing the upper platen in its operative, pressure-applying position.

It will be apparent that the full pressure is applied when the links 47 and 48 of each toggle joint 45 are substantially straight, see FIG. 4, and it is at this time that the connections 55 are subjected to the maximum load. In order to prevent undue wear, the connections 55 are arranged so that the axis of each of the eccentric portions 65 is included in the line of force through the axis of the shaft 62 in any adjusted position of the parts of the connections 55.

Figure 8:
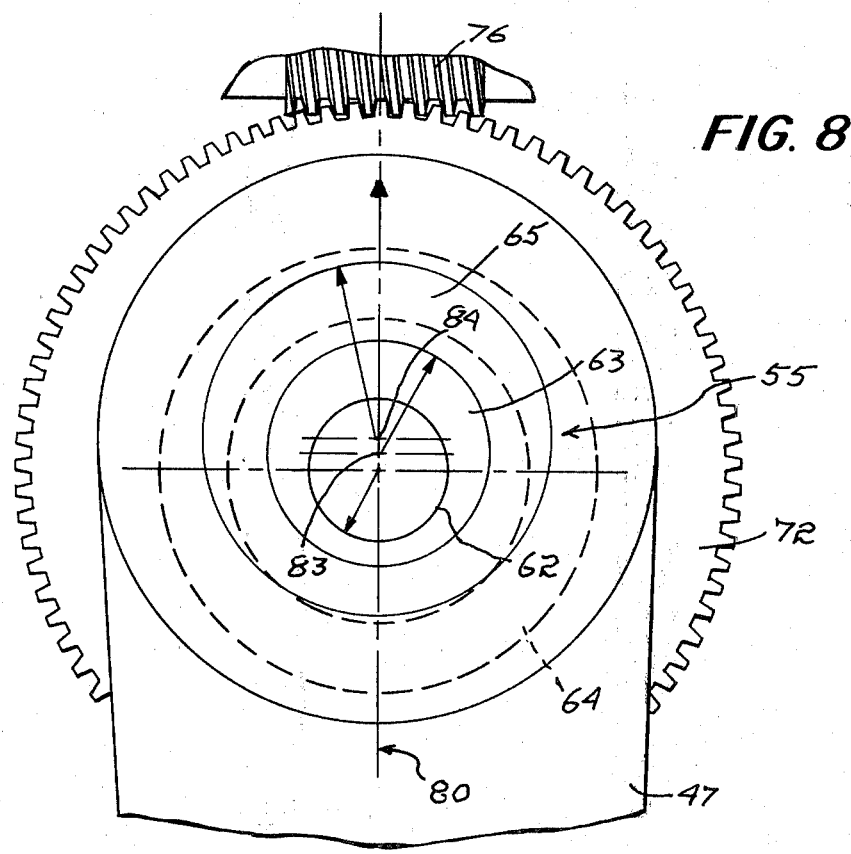
FIG. 8 is a somewhat schematic view of a connection showing the relationship of the parts to a predetermined line of force prior to an adjustment.
Figure 9:
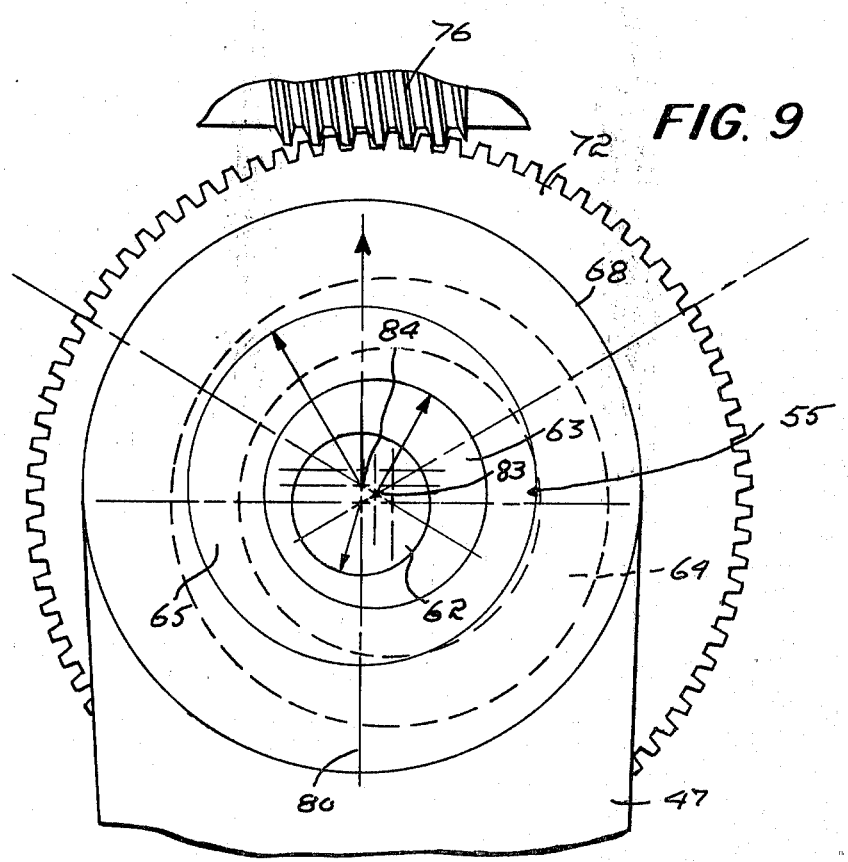
FIG. 9 is a like view but showing the relationship of the parts adjusted into a mid-range position.

Reference is now made to FIGS. 7 – 9. With the parts of each connection 55 positioned as shown in FIG. 7, the axes of the arms 47 are in their uppermost positions relative to the head 37. It will be noted from FIG. 4 that the plane of the line of force 82 exerted on the axes of the pivots 49, 50 and of the shaft 62 when the full working pressure is being applied also includes the axis 83 of the eccentric portion 63 and the axis 84 of the eccentric portion 65. In FIG. 9, the connection 55 has been adjusted into a mid-range relationship with the axes of the arms 47. The worm gear 71 has been turned clockwise and the gears 72 counterclockwise and while the axis 83 of the eccentric portion 63 has migrated to the right of the line of force 80, the turning of the gear 72 has maintained the axis 84 in the plane thereof. It will be appreciated that due to the eccentricity of the hub 64, the lowering of the eccentric portion has been compensated with the result that the worm gear 72 remains in proper meshing engagement with the worm 76 at all times.

It will be noted that the toggle joints 45 and 46 are shown as having their arms in an acute angular relationship when the platens are inoperatively positioned and the molds opened, see FIG. 2, an arrangement that is preferred for several reasons but has the disadvantage that the several pivotal connections of the toggle joints to be opened is high until the angular relationship of their arms is about 90°.

For that reason, the forming station is provided with pairs of double acting, hydraulic rams generally indicated at 85 and 86 for the purpose of so assisting the rams 57 and 57A, respectively, in the movement of the platens 39 and 40 in both directions, thereby to minimize wear resulting from the acute angular relationship of the toggle joints at the start of each forming operation. The cylinder 87 of the rams 85 is pivotally connected to the head 37 adjacent its ends and the stems 88 thereby pivotally connected to the subjacent margins of the platen 39. In the case of the rams 86, their cylinders 89 are pivotally connected to the support 35 and their stems 90 are pivotally connected to the undersurface of the platen 40 adjacent its side margins.

Figure 10:
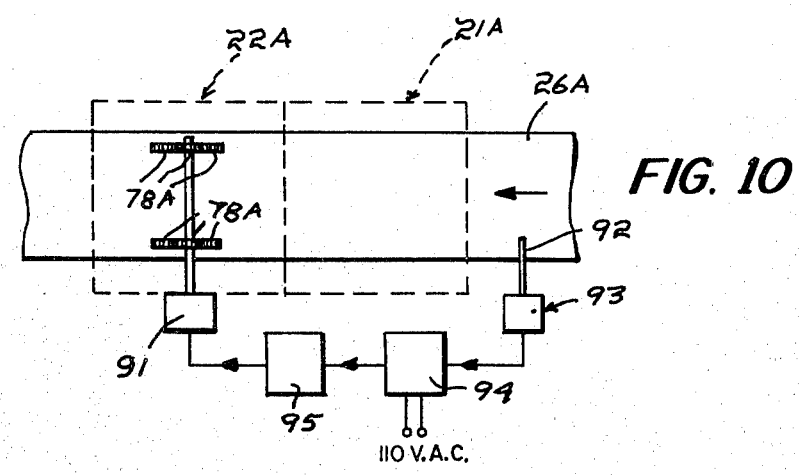
FIG. 10 is a schematic view of another embodiment of the invention.
Figure 5:
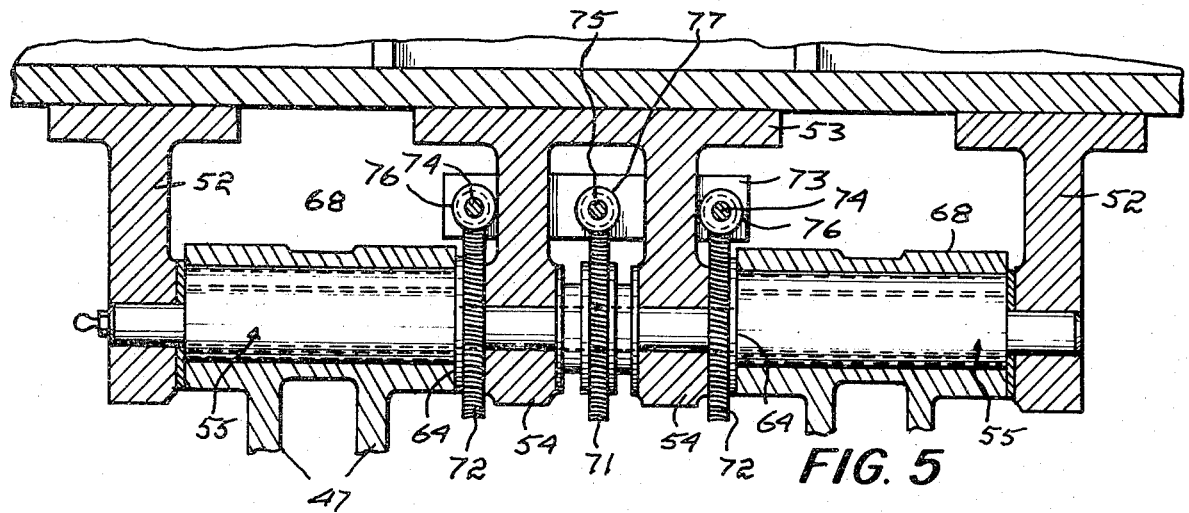
FIG. 5 is a section, on a further increase in scale, taken approximately along the indicated line 5—5 of FIG. 4.

The apparatus has been described as having its toggle joints 45 under the control of manually operated adjusting means common to all of them. Reference is now made to FIG. 10 wherein an embodiment of the invention is schematically shown with the shaft 80A of the adjusting means under the control of a servo motor 91.

In FIG. 10, the sheet 26A is shown as being advanced by steps through a heating station 21A and a forming station 22A. At the infeed side of the heating station 21A there is shown the probe 92 of a thickness gauge 93 of a type capable of continuously monitoring the sheet 26A for variations in its thickness and providing an output to an amplifier 94 that is precisely related to the monitored sheet thickness. Suitable gauges are commonly available for this purpose, among them those manufactured, for examples, by Airtronics Instrument Laboratories, Division Size Control Co. of Elgin, Ill., (an air-operated type), Automation Industries, Inc., Sperry Division, Danbury, Conn., (an ultrasonic type), General Nucleonics Division, Tyer Laboratories, Inc., Pomona, Calif., (radiation type), and Harrew Incorporated, East Norwalk, Conn., (nuclear back scatter type using gamma rays).

As the proper heat treatment of the sheet 26A requires a heating station length that can accommodate a plurality, three for example, of the predetermined lengths that are required at the forming station 22A, a shift register 95 is in the circuit between the amplifier 94 and the servo motor 91. Such shift registers are well known and the shift register 95 has the appropriate number of storage units to ensure the correct operation of the servo motor 91 when a predetermined length of material reaches the forming station 22A.

It is desirable that correcting adjustments be made while the molds are open and to that end, the output of the shift register is timed to be released when the conveyor is again indexed, the output of the shift register providing a servo operating signal for the length then in the forming station 22A representing the previously measured average thickness of that length.

A desirable feature of a forming station is a safety lock. It is customary for the molds of a thermoformer to be open when the thermoformer is shut down. In FIG. 3, a stop block 96 is shown as slidably supported on the undersurface of the platen 39 in a position to underlie a stop 44 thus to prevent contact of the stops 44 with the stops 43. The stop block 96 is connected to the stem of an air operated unit, the cylinder 97 of which contains a spring 98 normally urging the stop block 96 into its operative position from which it is held by air under pressure whenever the thermoformer is in operation.

We claim:

1. A device for use in applying pressure on work, said device including at least one first member and one second member and an adjustable connection between them operable to vary the relationship of the second member relative to the work, said connection including first and second rotatable parts, the first part rotatably supported by the first member, both parts including first portions and second portions, said second portions being eccentric and of circular section, the eccentric portion of the first part rotatable within the eccentric portion of the second part, and the eccentric portion of the second part rotatably carried by the second member, and adjusting means connected to the first portions and operable to turn said parts equally but oppositely thereby to shift the axes of said eccentric portions towards and away from a plane normal to a predetermined line of force through the axis of said first part without said force becoming torsional relative to the eccentric portion of the second part.

2. The device of claim 1 in which the adjusting means is also operable to maintain the two parts in their adjusted relationship.

3. The device of claim 1 and means maintaining said first portions in a predetermined constant relationship relative to said normal plane.

4. The device of claim 1 in which the first member is a mount, the second member is an arm of a toggle joint, and the connection is a pivot.

5. The device of claim 4 in which the first part is a shaft, the second part is a hub and its eccentric portion is a sleeve in which the eccentric portion of the first part is rotatably fitted.

6. The device of claim 5 in which the turning means for the shaft is supported by the first member and is connected to said shaft and to said hub.

7. The device of claim 5 in which the first portions are gears and the hub gear is eccentrically connected to said hub in a manner such that as the sleeve turns to vary the distance of its axis from said normal plane, the axis of said hub gear remains a constant distance therefrom.

8. The device of claim 7 in which the gears are worm gears and a gear train carried by the first member includes oppositely driven worms, one for each worm gear and in mesh therewith.

9. The device of claim 1 in which there are a plurality of first and second members arranged to provide a pair of transversely spaced toggle joints with the first members mounting structure including mounts between the toggle joints and the second members corresponding toggle joint arms, the connections axially aligned pivots, the first part of each connection is a shaft, the second part of each connection is a hub and the first portion of each second part is a worm gear, and the first portion of the first part is a worm gear common to both shafts and connected thereto, the turning means includes parallel shafts carried by the mounts, one for each worm gear and including a worm in mesh therewith, the worm gear shaft for the common worm gear between the other shafts and the hub worm gears are eccentrically connected thereto with their eccentricity so offsetting that of the eccentric portion of the second parts that said hub worm gears remain in mesh with the appropriate worm gears in any adjusted relationship of the parts of the connection.

10. Apparatus for performing work on sheet material, said apparatus comprising first and second units, at least one unit movable relative to the other between operative and inoperative positions, in said operative position opposite surfaces of the material in engagement with both units, and means operable to reciprocate said one unit between said positions and to apply a predetermined pressure on the material in said operative position, said means including at least one device by which working pressure is transmitted and which includes at least one first member, at least one second member and an adjustable connection between the first and second members operable to vary their relationship to effect a predetermined relationship between said units in said operative position, said connection including first and second parts, the first part rotatably carried by the first member, each part including first and second portions, the second portions eccentric and of circular section with that of the first part rotatable in the eccentric portion of the second part, the eccentric portion of the second part rotatably carried by the second member, means connected to said first portions and operable to rotate said parts equally but oppositely to shift the axes of said eccentric portions towards or away from a plane normal to a predetermined line of force applied lengthwise to the connection in said operative position without said force becoming torsional.

11. The apparatus of claim 10 in which said unit-reciprocating means includes a plurality of devices and the means operable to rotate the parts thereof is common to the first portions of both parts of said devices.

12. The apparatus of claim 10 in which the sheet material is in long lengths, the apparatus includes means to convey said material between said units, a thickness gauge continuously monitors the sheet thickness before its entry between the units and the means rotating said parts includes a servo motor driven in response to the output of said thickness gauge.

13. The apparatus of claim 10 in which the conveyor indexes said material by predetermined lengths, each length appropriate for the dimensions of said units and the conveyor travel is interrupted by dwells appropriate for the coaction of said units, and the thickness gauge measures the thickness of the material of a predetermined length being advanced between said units.

14. The apparatus of claim 13 in which the units are the molds at the forming station of a thermoformer and the apparatus includes a heating station to soften the sheet material before it reaches the forming station and the heating station is of a length to accommodate a predetermined number of lengths, the probe of the thickness gauge is adjacent the infeed end of the heating station, and the output circuit of the thickness gauge includes an amplifier and a shift register operable to release a servo operating signal as the predetermined length responsible for the signal reaches the forming station.

15. The apparatus of claim 11 in which the devices are toggle joints and the arms of the toggle joints have an acute angular relationship when the unit is inoperatively positioned and the reciprocating means also includes fluid pressure operated means operable to minimize strain on said joints when movement of said unit from its inoperative to its operative position is initiated.

* * * * *